United States Patent [19]

Stemmler et al.

[11] Patent Number: 4,780,326
[45] Date of Patent: Oct. 25, 1988

[54] COMPOSITION FOR MAKING PIGMENTED PROTECTIVE COATINGS ON MEAT PRODUCTS

[76] Inventors: Matthias Stemmler; Heniz Stemmler, both of Konrad-Adenauer-Ufer 35, D-5000 Cologne, Fed. Rep. of Germany

[21] Appl. No.: 44,931

[22] Filed: May 1, 1987

Related U.S. Application Data

[63] Continuation of Ser. No. 884,567, Jul. 11, 1986, abandoned, which is a continuation of Ser. No. 810,132, Dec. 17, 1985, abandoned, which is a continuation of Ser. No. 704,805, Feb. 25, 1985, abandoned, which is a continuation of Ser. No. 641,795, Aug. 17, 1984, abandoned, which is a continuation of Ser. No. 471,071, Mar. 2, 1983, abandoned, which is a continuation of Ser. No. 246,967, Mar. 24, 1981, abandoned.

[51] Int. Cl.⁴ .......................... C08L 1/08; B65D 85/00
[52] U.S. Cl. ...................................... 426/125; 106/186
[58] Field of Search ................ 106/186, 201; 426/125

[56] References Cited

U.S. PATENT DOCUMENTS

| | | | |
|---|---|---|---|
| 2,840,474 | 6/1958 | Wirt et al. | 106/191 |
| 2,840,476 | 6/1958 | Wirt et al. | 106/191 |
| 2,864,708 | 12/1958 | Tebbens | 426/125 |
| 2,868,656 | 1/1959 | Patten et al. | 106/191 |
| 3,000,748 | 9/1961 | Clark | 426/125 |
| 3,388,085 | 6/1968 | Levkoff | 426/125 |
| 3,818,947 | 6/1974 | Rose | 138/118.1 |
| 3,936,312 | 2/1976 | Stemmler et al. | 106/171 |
| 4,543,370 | 9/1985 | Porter et al. | 106/149 |

*Primary Examiner*—Theodore Morris
*Attorney, Agent, or Firm*—Sprung Horn Kramer & Woods

[57] ABSTRACT

The present invention comprises a pigmented protective coatings based on acetylated monoglycerides and cellulose esters, characterized in that it contains
(a) distilled, acetylated monoglycerides,
(b) synthetic waxes from the group of paraffin waxes and if necessary, microcrystalline waxes,
(c) cellulose esters, and
(d) pigments.

17 Claims, No Drawings

COMPOSITION FOR MAKING PIGMENTED PROTECTIVE COATINGS ON MEAT PRODUCTS

This is a continuation of application Ser. No. 884,567, filed July 11, 1986, now abandoned which is a continuation of Ser. No. 810,132, filed Dec. 17, 1985, now abandoned, which is a continuation of Ser. No. 704,805, filed Feb. 25, 1985 now abandoned, which is a continuation of Ser. No. 641,795, filed Aug. 17, 1984, now abandoned, which is a continuation of Ser. No. 471,071, filed Mar. 2, 1983, now abandoned, which is a continuation of Ser. No. 246,967, filed Mar. 24, 1981, now abandoned.

This inventions relates to compositions for coating meats, particularly pigmented protective coatings based on acetylated monoglycerides and cellulose esters.

It is well known that raw sausages, such as salami, for example, can be covered with a white coating, if, with the use of a water-soluble binder, they are dipped in an aqueous suspension of pigment, for example, of titanium dioxide or chalk, with a water content of 50-60%. Then the salami, which has been provided with a white coating, is removed from the dipping bath and dried. The drying period is 12-48 hours. This is particularly disadvantageous, because production has to be interrupted for several days for the drying process, and this requires a great deal of space. As a result of this long dryingg period, during which the sausage material is in the moist medium of the coating mass, undesirable foreign substances may get into the sausage material. It is known furthermore, that the white coating that has been manufactured in the manner described above can be separated from the sausage material extraordinarily poorly, contrary to the legal regulations. Besides, in this process, the undesirable dry edge is formed under the skin of the sausage.

At the present time, the process described above is the only process for the manufacture of salami with a white coating that is known and carried out. As described, this process is extraordinarily time-consuming and laborious.

From German Pat. No. 22 22 280, a process is known for the manufacture of a protective coating on meat products based on acetylated monoglycerides. In this process, the meat products are dipped in a melted, distilled monoglyceride, whose hydroxy groups are partly acetylated, and which contains 1-20% by weight of a lower molecular polyethylene methacrylate resin. The protective coatings formed in the process are as clear as glass and transparent.

From German Pat. No. 23 24 936, an agent is known for the manufacture of transparent coatings on smoked meats which contains an acetylated monoglyceride and cellulose propionate in definite proportions by weight and acetone as a solvent. With this process, too, transparent coatings are obtained.

In the German patents mentioned above, a further state of the art is also described, which relates to the manufacture of protective coatings on meat products based on acetylated monoglycerides and cellulose esters.

The present invention takes up the problem of creating a new agent for the manufacture of pigmented protective coatings on meat products that dioes not exhibit the disadvantages described above.

The problem is solved by means of the agent according to the present invention for the manufacture of pigmented protective coatings based on acetylated monoglycerides and cellulose esters, characterized in that it contains
(a) distilled, acetylated monoglycerides,
(b) synthetic waxes from the group of paraffin waxes and, if necessary, microcrystalline waxes,
(c) cellulose esters, and
(d) pigments.

The agent according to the present invention is used for the manufacture of pigmented protective coatings on meat products and, especially, on smoked meat products, such as raw sausages and raw meat. Examples of raw sausages are salami, bologna-type sausages, and smoked ham sausages. Examples of raw mmeat are ham, Canadian bacon, jerked beef, and Neuenahrer meat.

As distilled, acetylated monoglycerides, those that are permissible under the Pure Food Act come under consideration. Those monoglycerides described in German Pat. No. 22 22 280, for example, have proved to be particularly suitable. Hydrogenated hog fat or lard and hydrogenated cottonseed oil, among others, serve as a source of fat for obtaining these monoglycerides.

The monoglyceride obtained from hog fat or lard is acetylated to such an extent that ⅔ of the free hydroxy groups are occupied. This acetylated monoglyceride is a white, waxy solid substance that does not feel greasy, and that has the following properties:
melting point 37° to 40° C.
refractive index at +50° C. 1.442
viscosity at +50° C. 27 cps
iodine number 3 max
monoglyceride about 7%
acetylation 66% to 70%
acid number less than 4.

The monoglycerides obtained from hydrogenated cottonseed oil are acetylated only to the extent that half of the hydroxy groups are acetylated. Such a monoglyceride is also a creamy, white, waxy solid that does not feel greasy, and has the following properties:
melting point 41° to 46° C.
clear point 60° C. (temperature at which the melted monoglyceride is clear)
refractive index at +60° C. about 1.441
viscosity at +50° C. 30 cps
specific gravity at +50° C. 0.94 (liquid)
iodine vlue max 3%
monoglyceride about 18%
acetylation 48% to 52%
acid number less than 4

Such synthetic waxes, that is, paraffin waxes and/or microcrystalline waxes, of food quality come under consideration as meet the regulations of the Pure Food Act. Examples of the paraffin waxes are the hard paraffins mentioned in the Fillers Trade Order of Dec. 20, 1977 under the Pure Food Act from mixtures of purified, mainly straight-chained saturated hydrocarbons from petroleum, which form a white to transparent, odorless, waxy to brittle mass of melting point 43° to 75° C. (DIN 51556), and have a viscosity at 100° C. of max 5.8 centistokes and an iodine number of max 1.

Examples of the microcrystalline waxes are the mixtures, mentioned in the abiove order, of purified, solid, mainly branched, saturated, microcrystalline hydrocarbons from petroleum, which form a white, hard, odorless mass of melting point 50° to 90° C. (DIN 51556), and have a viscosity of 5.8 to 35 centistokes and an iodine number of max 60.

Cellulose acetate, cellulose acetobutyrate, and, especially, cellulose propionate come under consideration as cellulose esters. It is preferable to use a cellulose propionate of low viscosity of 0.2 to 20 $\sec^b$, preferably 0.2 to 10 $\sec^b$, and, especially, 0.5 $\sec^b$, measured according to ASTM D-871-48, which, for example, is manufactured by Eastman Kodak, and is obtainable commercially under the designation CAP 0.5.

All pigments that meet the regulations of the Pure Food Act and are permissible come under consideration as pigments for the coating agent. The agent for the manufacture of white protective coatings contains, especially, pigments from the group titanium dioxide, calcium phosphate, potassium metaphosphate, sodium metaphosphate, magnesium silicate, prepared chalk, and calcium derivatives. Of these, titanium dioxide is especially preferred at the present time.

For the manufacture of pigmented protective coatings of other colors, the agent according to the present invention correspondingly contains other pigments permissible under the Pure Food Act that are familiar to those skilled in the art. For example, for the manufacture of a black protective coating, the agent contains a black pigment, such as, for example, iron oxide black, animal charcoal, and wood charcoal, and for a brown pigment, iron oxide brown.

The proportions of components a, b, c, and d may vary, according to the nature of the meat product to be coated on the color of the opaque protective coating to be produced on the meat products. Amounts of 20 to 60, preferably 25 to 45, and especially 30 to 35 parts by weight have proved suitable for components a. Amounts of 30 to 70, preferably 40 to 60, and especially 50 to 55 parts by weight have proved to be suitable for component b.

Component c is present in a suitable manner in amounts of 5 to 20, preferably 6 to 15, and especially 8 to 12 parts by weight. Component d is present in a suitable manner in amounts of 5 to 25, preferably 12 to 20, and especially 10 to 17 parts by weight.

As an agent for coating salami in manufacturing a white protective covering on the salami, that is, in manufacturing a so-called "white salami," one composition, especially, hs proved itself. It contains 30 to 35 parts by weight of distilled, acetylated monoglyceride, 50 to 55 parts by weight of paraffin wax and, if necessary, microwax, 8 to 12 parts by weight of cellulose propionate of low viscosity, and 9 to 11 parts by weight, for example, of titanium dioxide.

To obtain a dull appearance in the white protective coating on the salami, insoluble calcium metaphosphate or magnesium silicate, for example, may be used.

Because of the large number of fundamentally different types of smoked meat products, it is, to begin with, impossible to give examples for all these products. Besides, this is superfluous, too, since it will not be difficult for the meat expert to determine, through small-scale experiments, the agent that has the most advantageous composition for each type of meat.

In order to put on the pigmented protective coating, the meat product, for example, the raw sausage, such as a salami, or the raw meat, such as a ham, is dipped into the agent at a temperature of 100° to 120° C. The dipping period is a few seconds, 3–4 seconds usually being sufficient. A dipping period in this range is necessary in order to achieve a sterile surface.

The draining and solidifying time is only about 30 seconds. The white-coated meat products, such as, for exammple, the raw sausages or the raw meat, can already be packed after another 60 seconds.

The pigmented protective coating, for example, the white film, has a thickness of about 3% by weight with a dipping temperature of about 120° C. and 4 to 4.5% by weight at a dipping temperature of about 100° C., referred to the total weight of the coated meat products, for example, the raw sausage.

The coatings obtained are pigmented, that is, opaque, for example, white, and thin, and can easily be pulled off the meat product again. Furthermore, they have the remarkable property of limited permeability to water vapor. This means that the pigmented protective film is capable of molecular gas exchange. The properties connected with this, which regulate the water economy, prevent the unavoidable and undesirable dry edge that appears in the familiar process for the manufacture of a pigmented white protective coating. In addition, the white protective coating substantially prevents the loss on drying, and this is of decisive significance for the maintenance of quality.

The coatings manufactured with the agent according to the present invention, furthermore, do not prevent the passage of odorous substances, so that the purchaser can examine the product as he is accustomed to, not only with his eyes, but also with his nose. The purchaser may, therefore, examine the meat product for its natural quality.

The coatings from the agent according to the present invention, furthermore, are heat-resistant up to about 50° C. without any detrimental effect on the product, and the protective film's resistance to cold without any detrimental effect on the product down to about −40° C. is guaranteed. The coatings are resistant to pressure, impact, and other rather strong external influences that the meat product would not endure without the protective coatings. A new kind of packing system, therefore, is also involved here, so to speak, in which the opaque, for example, white, protective covering formed by the agent according to the present invention guarantees flexible and hygienic packing.

An additional significant point, especially for the manufacture of white protective coatings, is the fact that the protective coating or film is absolutely free from water. The new protective film has the property of forming an evaporation barrier that almost eliminates the normal loss in weight.

A comparison on the basis of a white salami manufactured according to the previously known process and a white salami manufactured with the agent according to the present invention produces the following results:

According to the familiar process, the white salami is manufactured by dipping it into an aqueous suspension of titanium dioxide and/or chalk, with a water content of 50% to 60%. Even the suspension is not simple to prepare and can not be handled well. After removal from the dipping means, drying is carried out for 12–48 hours, as a result of which there is a large space requirement, besides a loss of time, and in addition, contamination of the salami may take place.

On the other hand, with the agent according to the present invention, a white salami is manufactured by dipping it into dipping mass of an acetylated monoglyceride, a paraffin wax and/or microcrystalline wax, a cellulose propionate of low viscosity, and titanium dioxide for 3–4 seconds. The drying period, that is, the draining and solidifying time is only 30 seconds, and after another 60 seconds, the white-coated salamis can already be packed. This represents enormous and unexpected technological progress.

Furthermore, the white protective coating on the salami makes possible a molecular gas exchange, and the properties connected with this that regulate the water economy prevent the undesirable dry edge that was unavoidable in the previously known process for the manufacture of white salami.

The white protective coating that is manufactured with the agent according to the present invention can be pulled off the salami sausage without breaking, while this is not possible with the familiar coating mass, since here only separate pieces can be pulled off in each case.

The white protective coating or film for the white salami that is produced with the agent according to the present invention is absolutely free from water, and guarantees a flexible and hygienic packing.

In order to manufacture coatings according to the present invention, a dipping mass is first prepared by putting, for example, 30 kg of an acetylated monoglyceride indicated above, 50 kg of a paraffin wax, 10 kg of cellulose propionate, and 12 kg of titanium dioxide into a high-speed mixer that has been heated to 185° C., and mixing. Then it is cooled off, and the mass is emptied into a tank.

EXAMPLE 200 kg of the dipping mass indicated above is heated to 100°–120° C. in a tank that can be heated and that has been made of material suitable for the processing of food. Raw sausages are dipped into the melted mass for 3–4 seconds, then removed from the mass, and allowed to drain and dry for 30 seconds. After another 60 seconds, the sausages, covered with the white protective coating, are packed in the usual way.

In this manner, raw sausages, such as, for example, salami sausages, with a white protective coating are obtained, which exhibits the surprising and advantageous properties described above.

It will be understood that the specification and examples are illustrative, but not limitative of the present invention and that other embodiments within the spirit and scope of the invention will suggest themselves to those skilled in the art.

What is claimed is:

1. A hot melt composition for the coating of meat with an opaque hot melt coating, the composition by weight comprising approximately
   (a) 20 to 60 parts of acetylated monoglycerides,
   (b) 30 to 70 parts of a paraffin and/or microcrystalline wax,
   (c) 5 to 20 parts of a cellulose ester, and
   (d) 10 to 25 parts of a pigment selected from the group consisting essentially of titanium dioxide, calcium phosphate, potassium metaphosphate, sodium metaphosphate, magnesium silicate, prepared chalk, chalk derivatives, iron oxide black, iron oxide Brown animal charcoal or wood charcoal.

2. A composition according to claim 1 by weight comprising approximately
   (a) 25 to 45 parts,
   (b) 40 to 50 parts,
   (c) 5 to 15 parts, and
   (d) 10 to 20 parts.

3. A composition according to claim 1 by weight comprising approximately
   (a) 30 to 35 parts,
   (b) 50 to 55 parts,
   (c) 8 to 12 parts, and
   (d) 12 to 17 parts.

4. A composition according to claim 1, wherein (a) is obtained from lard and comprises a distilled acetylated monoglyceride whose hydroxy groups are up to two-thirds acetylated.

5. A composition according to claim 1, wherein (a) is obtained from cottonseed oil and comprises a distilled acetylated monoglyceride whose hydroxy groups are up to one-half acetylated.

6. A composition according to claim 1, wherein (b) is a hard paraffin wax with a melting point of 43° to 75° C. (DIN 51556) and/or a purified, solid, mainly branched, saturated microcrystalline hydrocarbon from petroleum with a melting point of 50° to 90° C. (DIN 51556).

7. A composition according to claim 1, wherein (c) is cellulose propionate, cellulose acetate or cellulose acetobutyrate.

8. A composition according to claim 1, wherein (c) is cellulose propionate of 0.2 to 20 $\sec^6$.

9. A composition according to claim 1, wherein (d) is titanium dioxide, calcium phosphate, potassium metaphosphate, sodium metaphosphate, magnesium silicate, prepared chalk, chalk and/or chalk derivatives.

10. A composition according to claim 1, wherein (d) is iron oxide black, iron oxide brown, animal charcoal, or wood charcoal.

11. A composition according to claim 3, wherein (c) is cellulose propionate and (d) is titanium dioxide.

12. Smoked meat carrying an opaque coating of the composition of claim 1.

13. Salami carrying a white opaque coating of the composition of claim 11.

14. A composition according to claim 1 by weight comprising approximately 20 parts of (d).

15. A composition according to claim 14, wherein (d) is titanium dioxide.

16. A composition according to claim 1 by weight comprising approximately
   (a) 35 parts,
   (b) 38 parts,
   (c) 7 parts, and
   (d) 20 parts.

17. A composition according to claim 1 by weight comprising approximately
   (a) 35 parts acetylated monoglycerides,
   (b) 38 parts paraffin,
   (c) 7 parts cellulose acetate propionate, and
   (d) 20 parts titanium dioxide.

* * * * *

UNITED STATES PATENT AND TRADEMARK OFFICE
CERTIFICATE OF CORRECTION

PATENT NO.   : 4,780,326
DATED        : Oct. 25, 1988
INVENTOR(S)  : Stemmler et al.

It is certified that error appears in the above-identified patent and that said Letters Patent is hereby corrected as shown below:

| | |
|---|---|
| Title Page, under "Inventors" | Correct spelling of --Heinz-- |
| Title Page, after Item [22] | Insert -- [30] Foreign Application Priority Data March 28, 1980 Fed. Republic of Germany 3012192-- |
| Title Page, under "Related U.S. Application Data", line 4 | Correct date to --Feb. 25, 1982-- |
| Col. 1, line 9 | Correct date to --Feb. 25, 1982-- |
| Col. 1, line 28 | Correct spelling of --drying-- |
| Col. 1, line 65 | Correct spelling of --does-- |
| Col. 2, line 14 | Correct spelling of --meat-- |
| Col. 2, line 47 | Correct spelling of --value-- |
| Col. 3, line 15 | Insert --chalk,-- after "chalk," |
| Col. 3, line 32 | Delete "components" and substitute --component-- |
| Col. 3, line 44 | Correct spelling of --has-- |
| Col. 4, line 1 | Correct spelling of --example-- |

Signed and Sealed this

Third Day of October, 1989

Attest:

DONALD J. QUIGG

Attesting Officer

Commissioner of Patents and Trademarks